J. Knight,
Cow Tail Holder.
No. 103,753. Patented May 31, 1870.
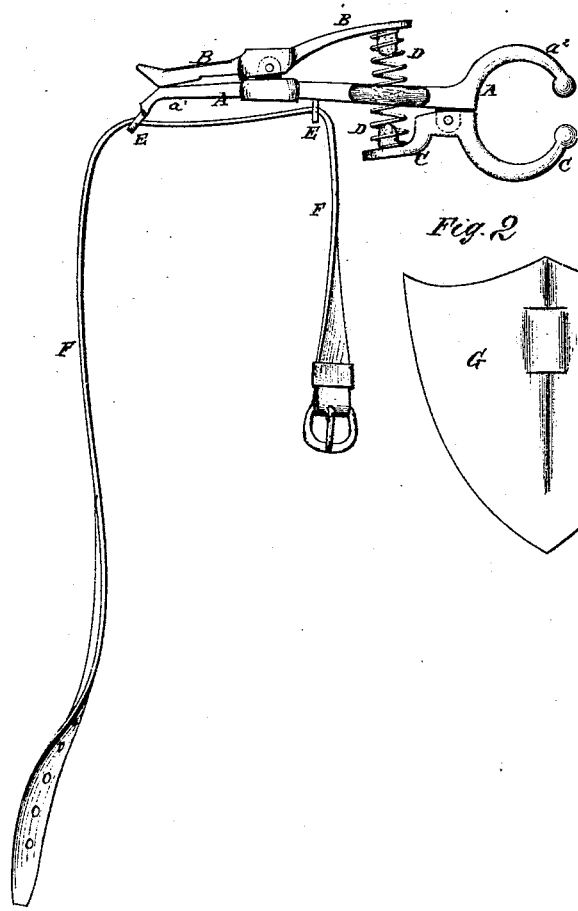

United States Patent Office.

JUDSON KNIGHT, OF WHITESTOWN, NEW YORK, ASSIGNOR TO HIMSELF AND M. C. BROWN, OF SAME PLACE.

Letters Patent No. 103,753, dated May 31, 1870.

IMPROVEMENT IN COW-TAIL HOLDER.

The Schedule referred to in these Letters Patent and making part of the same

*To all whom it may concern:*

Be it known that I, JUDSON KNIGHT, of Whitestown, in the county of Oneida and State of New York, have invented a new and useful Improvement in Cow's Tail Holder; and I do hereby declare that the following is a full, clear, and exact description thereof, which will enable others skilled in the art to make and use the same, reference being had to the accompanying drawing forming part of this specification, in which—

Figure 1 is a side view of my improved device.

Figure 2 represents a guard, to protect the clothes of the milker.

Similar letters of reference indicate corresponding parts.

My invention has for its object to furnish a simple and convenient device for holding a cow's tail while she is being milked, and The invention consists in the combination and arrangement of certain parts, as hereinafter specified.

A is the main or central bar of the device, which is made in about the form and manner shown in fig. 1, that is to say, one end $a^1$ of said bar A is made nearly straight.

The outer end $a^2$ is made curved, and terminates in a knob, as shown.

Upon the upper side of the forward part of the bar A is cast a tenon, which enters a socket cast in the lever B, to pivot the said lever to the said bar.

The forward part or jaw of the lever B is so formed as to correspond with the forward end $a^1$ of the bar A, as shown in fig. 1.

Upon the lower side of the other or rear part of the bar A is cast another tenon, which enters a socket cast in the lever C, so as to pivot the said lever to the said bar.

The outer end of the lever C is curved, and terminates in a knob, to correspond with the end of the bar A.

The inner ends of the levers B and C have lugs cast upon their inner sides, and rest upon the ends of the coiled spring D, which passes through a hole cast in the middle part of the bar A.

Upon the bar A, or some other suitable parts of the device, are formed, or to them are attached loops, to receive a strap, F, when required.

G is a shield, made of leather, cloth, or other suitable material, through slits in which the part of the strap F between the loops E is passed.

In using the device, a tuft of hair of the cow's tail is clamped between the jaw $a^1$ of the bar A, and the jaw of the lever B.

The knobs of the bar A and lever C are then passed over the gambrel-cord of the cow's leg, thus confining the cow's tail, so that she cannot switch the milker.

The tail of the cow upon the other side of the milker may be secured in the same manner.

In case the cow will not stand with the device attached to her leg, the strap F is passed through the loops E, and buckled around the leg of the milker, the tail being connected with the device in the manner hereinbefore described.

In this case, the shield G may be used to protect the clothes of the milker. The curved and knobbed ends or jaws of the bar A and lever C also adapt the device to be used as a nose-ring for leading cattle.

Having thus described my invention,

I claim as new and desire to secure by Letters Patent—

The combination of a cow's tail and leg-holder, having the loops E E on its main bar A, with a strap, F, and shield G, all constructed and relatively arranged as and for the purpose described.

J. KNIGHT.

Witnesses:
J. H. MARVIN,
ALFRED DAY.